(12) United States Patent
Feldman

(10) Patent No.: US 6,666,365 B1
(45) Date of Patent: Dec. 23, 2003

(54) ADJUSTABLE MICRO DEVICE FEEDER

(75) Inventor: Dmitry Feldman, Seattle, WA (US)

(73) Assignee: Data I/O Corporation, Redmond, WA (US)

( * ) Notice: Subject to any disclaimer, the term of this patent is extended or adjusted under 35 U.S.C. 154(b) by 24 days.

(21) Appl. No.: 10/029,487

(22) Filed: Dec. 21, 2001

(51) Int. Cl.$^7$ ................................................. G03B 1/24
(52) U.S. Cl. ........................ 226/79; 226/179; 242/615.3
(58) Field of Search ............................ 226/79, 86, 137, 226/174, 179; 242/615.3; 156/584

(56) References Cited

U.S. PATENT DOCUMENTS

| | | | | |
|---|---|---|---|---|
| 1,972,555 A | * | 9/1934 | Fear | 226/79 |
| 4,400,105 A | * | 8/1983 | Yeager et al. | 226/79 |
| 5,312,304 A | * | 5/1994 | Vetter | 226/79 |
| 5,588,614 A | * | 12/1996 | Takada et al. | 242/538.2 |
| 5,725,140 A | * | 3/1998 | Weber et al. | 226/139 |
| 5,806,745 A | * | 9/1998 | Irwin | 226/179 |
| 5,992,791 A | * | 11/1999 | Tsuda et al. | 242/535.3 |
| 6,202,913 B1 | * | 3/2001 | Takada et al. | 156/584 |
| 6,261,047 B1 | * | 7/2001 | Kubota | 156/584 |
| 6,379,098 B1 | * | 4/2002 | Shibasaki | 156/584 |
| 6,532,395 B1 | * | 3/2003 | Bolotin | 700/121 |

* cited by examiner

Primary Examiner—Michael R. Mansen
(74) Attorney, Agent, or Firm—Mikio Ishimaru

(57) ABSTRACT

A micro device feeder is provided which is adjustable to accommodate micro devices supplied on tapes with different widths. A mounting plate has a movable drive plate slidably mounted thereto. An input mechanism on the movable drive plate receives micro devices contained in a tape. A sprocket engages and advances the tape under motor drive. A feeder width adjustment mechanism allows for movement of the movable drive plate relative to the mounting plate for adjusting the sprocket to accommodate tapes with different widths where the distance between the tape and sprocket centerlines change. The feeder width adjustment mechanism includes a pin coupled to the mounting plate, a securing device coupled to the movable drive plate and is capable of moving along the pin, and a locking mechanism capable of securing the securing device to the pin to lock the movable drive plate relative to the mounting plate.

24 Claims, 3 Drawing Sheets

ADJUSTABLE MICRO DEVICE FEEDER

CROSS-REFERENCE TO RELATED APPLICATION

The present application contains subject matter related to U.S. patent application Ser. No. 09/418,732. now U.S. Pat. No. 6,532,395, by Lev M. Bolotin entitled "MANUFACTURING SYSTEM WITH FEEDER/PROGRAMMING/BUFFER SYSTEM". The related patent is assigned to Data I/O Corporation and is hereby incorporated by reference.

TECHNICAL FIELD

The present invention relates generally to manufacturing system for electronic products, and more particularly to a micro device feeder system used in a manufacturing system.

BACKGROUND ART

Certain operations of electronic circuit board assembly involved supplying micro devices by a micro device feeder to a robotic handling system. The micro devices include a broad range of electronic and mechanical devices, such as programmable devices. Programmable devices, which include but are not limited to devices such as Flash memories (Flash), electrically erasable programmable read only memories ($E^2PROM$), programmable logic devices (PLDs), field programmable gate arrays (FPGAs), and microcontrollers.

The micro device feeders are generally aligned and connected underneath the robotic handling system. The micro devices are typically supplied in tape on reel. The tape includes a plurality of pockets for containing the micro devices. Typically, there is only one pocket across the width of the tape. The tape has sprocket holes or perforations in one side so that it can be driven through the micro device feeder.

The micro device feeder has a frame upon which a motor and pulley arrangement is mounted to drive a sprocket, which engages the perforations to linearly drive the tape through the micro device feeder. The frame also carries a spring-loaded backup plate to support the tape and also accommodate any sudden variations in tension in the tape.

The robotic handling system removes the micro devices as the micro device feeder in the tape linearly presents them and places them on buffer areas of the micro device feeder or directly on printed circuit boards moving through an electronic assembly line or manufacturing system. In high-speed systems, the robotic handling systems are linearly moving pick-and-place mechanisms. In such a system, the centerline of the linearly moving pick-and-place mechanism must coincide with the centerline of the pockets in the linearly moving tape.

A major problem associated with the handling of micro devices carried on tapes is that different micro device feeders are needed for different size micro devices because they must be supplied in different size tapes. For example, three different micro device feeders are required for 16-, 24-, and 32-millimeter wide tape. The reason for requiring a different micro device feeder is that the centerline of the linearly moving pick-and-place mechanism does not coincide with the centerline of the pockets in the linearly moving tape for different tape widths because of the perforations in the side of the tape.

The perforations in the tape cause a different offset between the centerline of the pockets and the centerline of the tape for each different tape width. Since the frame is connected to the robotic handling system and also to the motor and pulley arrangement and the sprocket, the centerline of the linearly moving pick-and-place mechanism is fixed relative to the centerline of the sprocket. The centerline of the sprocket fixes the centerline of the perforations, which means that the offset causes the centerline of the pick-and-place mechanism to not coincide with the centerline of the pockets.

Since there can be a large offset and most companies use different size tape widths, companies require a large number of different size micro device feeders, which is quite inconvenient and expensive.

Different approaches have been taken to try to solve this problem. One approach involves using a tape module, which forms a portion of the micro device feeder. The tape module is replaced for supplying micro devices contained in tapes with different widths. Therefore, instead of replacing the entire micro device feeder to accommodate for different size tape, only the corresponding tape module needs to be replaced. However, the tape module often constitutes almost half of the mechanism of a micro device feeder so it is still inconvenient and expensive to stock large number of tape modules to handle different size tapes.

Thus, those skilled in the art have long sought a micro device feeder, which is easily adjustable to accommodate micro devices supplied on tapes with different widths and is simple and inexpensive. Previous systems by those skilled in the art have been unsuccessful in providing a fully adequate solution.

DISCLOSURE OF THE INVENTION

The present invention provides a micro device feeder system, which is easily adjustable to accommodate micro devices supplied on tapes with different widths. The micro device feeder system is simple and inexpensive.

The present invention further provides a micro device feeder, which is adjustable to accommodate micro devices supplied on tapes with different widths. A mounting plate has a movable drive plate slidably mounted thereto. An input mechanism on the movable drive plate receives micro devices contained in a tape. A sprocket engages and advances the tape under motor drive. A feeder width adjustment mechanism allows for movement of the movable drive plate relative to the mounting plate for adjusting the sprocket to accommodate tapes with different widths where the distance between the tape and sprocket centerlines change. The feeder width adjustment mechanism includes a pin coupled to the mounting plate, a securing device coupled to the movable drive plate and is capable of moving along the pin, and a locking mechanism capable of securing the securing device to the pin to lock the movable drive plate relative to the mounting plate.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
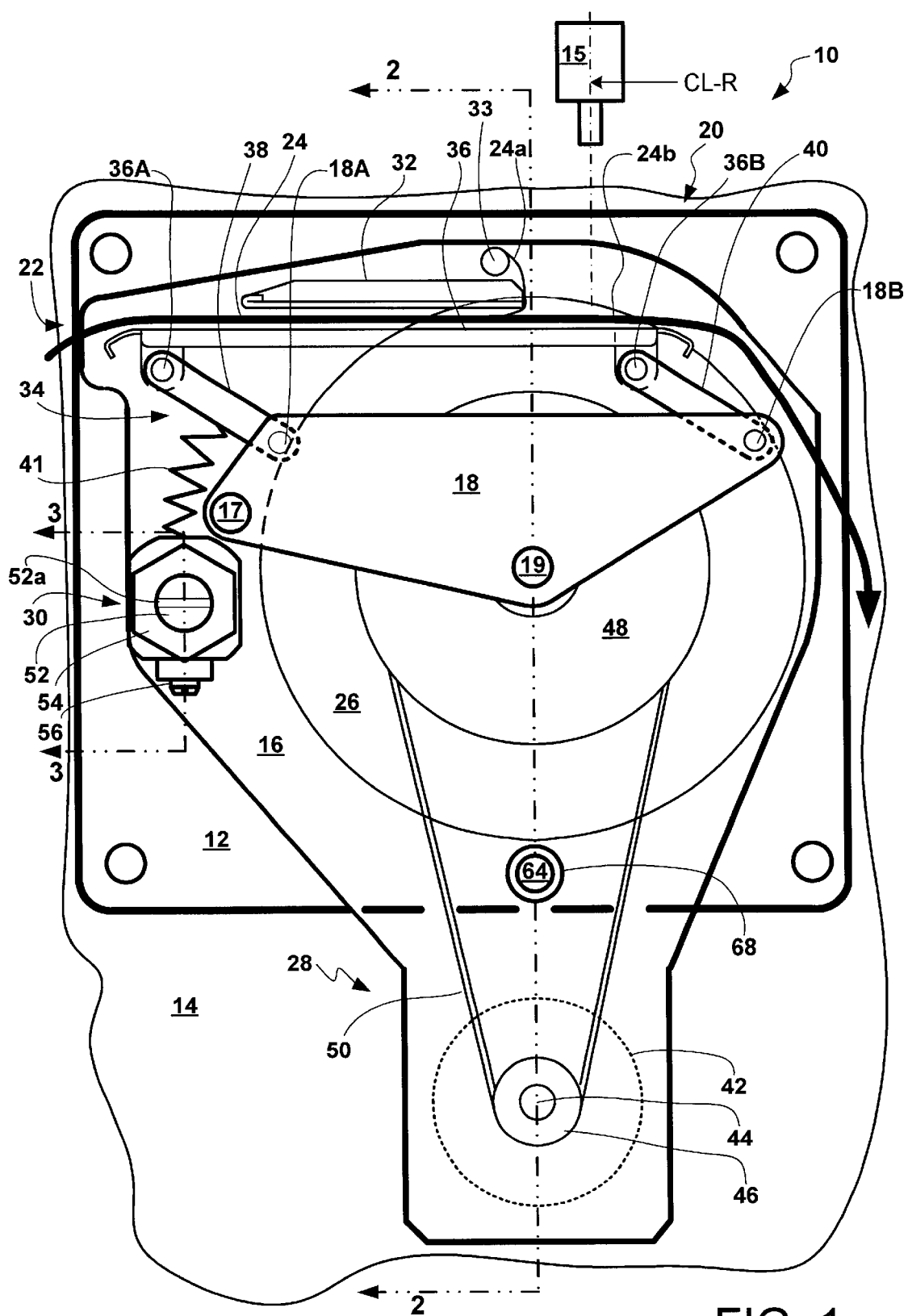
FIG. 1 is a side view of a feeder system constructed according to the present invention.

Structure:

Referring now to FIG. 1, therein is shown a feeder system 10 constructed according to the present invention. The FIGS. showing the embodiment of the present invention are semi-diagrammatic and not to scale and, particularly, some of the dimensions are shown greatly exaggerated and some structures are shown in different location for clarity of presentation. The term "vertical" as used in this application is defined as a plane parallel to the height and width of a mounting plate 12, regardless of the orientation of the mounting plate 12. The term "horizontal" refers to a direction perpendicular to the vertical as just defined. The terms "top", "upper", "bottom", "outside", etc. relate the various structures in terms of the vertical and horizontal directions.

The feeder system 10 is mounted on a main frame 14, which also carries a robotic handling system 15 (with a centerline CL-R). Moving outwardly from the main frame 14 are the main supporting plates, which include the mounting plate 12, a movable drive plate 16, and an outer plate 18, which moves with the movable drive plate 16.

The feeder system 10 includes a feeder mechanism 20. The feeder mechanism 20 includes the mounting plate 12, an input mechanism 22 for guiding a tape 24 (represented by an arrow showing its linear path) containing micro devices (not shown), a tape driver or sprocket 26 for engaging edge perforations in and advancing the tape 24, a drive mechanism 28 for driving the sprocket 26, and a feeder width adjustment mechanism 30 for adjusting the feeder system 10 to accommodate tapes with different widths; i.e., different offsets between the centerline of the tape and the centerline of the pockets in the tape 24. The engagement of the sprocket 26 in the perforations of the tape 24 assures positive linear movement of the tape 24 without lateral movement in and out from the main frame 14. The tape 24 includes a cover tape 24a and a carrier tape 24b. The tape 24 has a plurality of pockets (not shown) for holding micro devices.

The input mechanism 22 includes a top plate 32, a spring-loaded bottom guide 34 for receiving the tape 24, and a cover tape mechanism 33 which handles disposal of the cover tape 24a by rolling it on to a spool or crushing it for later removal and disposal. The spring-loaded bottom guide 34, which must be located outwardly from the sprocket 26 since the tape 24 is fed in with the perforations on the side towards the main frame 14, includes a bottom plate 36 positioned proximate to and below the top plate 32. The two plates are parallel and extend in the direction of movement of the tape 24 and cooperate to linearly guide and hold the tape 24 flat over a certain region so the robotic handling system 15 can easily remove micro devices.

The cover tape 24a is threaded between the top plate 32 and the bottom plate 36 and connected to the cover tape mechanism 33. The top plate 32 functions as a peeler for removing the cover tape 24a. The cover tape mechanism 33 applies tension to the cover tape 24a to assure that it is peeled off of the carrier tape 24b. The peeling off of the cover tape 24a exposes the micro devices on the carrier tape 24b. In one embodiment, the cover tape mechanism 33 includes a powered spool, which is activated to wind the cover tape 24a during advancing of the tape 24.

The spring-loaded bottom guide 34 must support the bottom of the pockets in the tape 24, must hold the tape 24 parallel against the top plate 32, and must adjust for different depth pockets since the pockets differ not only in width but in depth for different size micro devices. A complex structure is required.

The spring-loaded bottom guide 34 is mounted on the outer plate 18, which is mounted to the movable drive plate 16 by a bolt 17 and the drive mechanism 28 by a bolt 19. A first arm 38 pivotally connected between a first end of the bottom plate 36 using mounting pin 36A and a first corner of the outer plate 18 using mounting pin 18A, a second arm 40 pivotally connected between a second end of the bottom plate 36 using mounting pin 36B and a second corner of the outer plate 18 using mounting pin 18B, and a biasing mechanism 41 connected to the first arm 38 and the feeder width adjustment mechanism 30.

The outer plate 18, the bottom plate 36, the first arm 38, and the second arm 40 are aligned to form a parallelogram. The biasing mechanism 41 is used to provide an upward push to the first arm 38. In one embodiment, the biasing mechanism is a spring. As would be evident to those skilled in the art, other biasing devices, such as pneumatic devices, can be used. The biasing on the first arm 38 of the parallelogram formed by the outer plate 18, the bottom plate 36, the first arm 38, and the second arm 40 causes the bottom plate 36 to support the bottom of the pockets in the tape 24, to hold the tape 24 parallel against the top plate 32, and to adjust for different depth pockets as the tape 24 progresses through the feeder system 10.

The drive mechanism 28 includes a motor 42 mounted on the movable drive plate 16. The motor 42 includes a drive shaft 44 and a motor pulley 46 mounted on the drive shaft 44. The motor pulley 46 drives a sprocket pulley 48 through a belt 50 from the motor 42. The sprocket 26 is mechanically fastened to the sprocket pulley 48. As would be evident to those skilled in the art, a tensioning mechanism is provided to maintain the proper tension on the belt 50. This arrangement permits the motor to remain stationary relative to the sprocket 26 at all times with the proper belt tension.

The feeder width adjustment mechanism 30 includes an adjustment structure or adjustment pin 52, which is secured to the mounting plate 12. The adjustment pin 52 has a slot 52a on one end. The adjustment pin 52 extends through the movable drive plate 16 and engages a securing device 54, which includes a detent 56.

Figure 2:
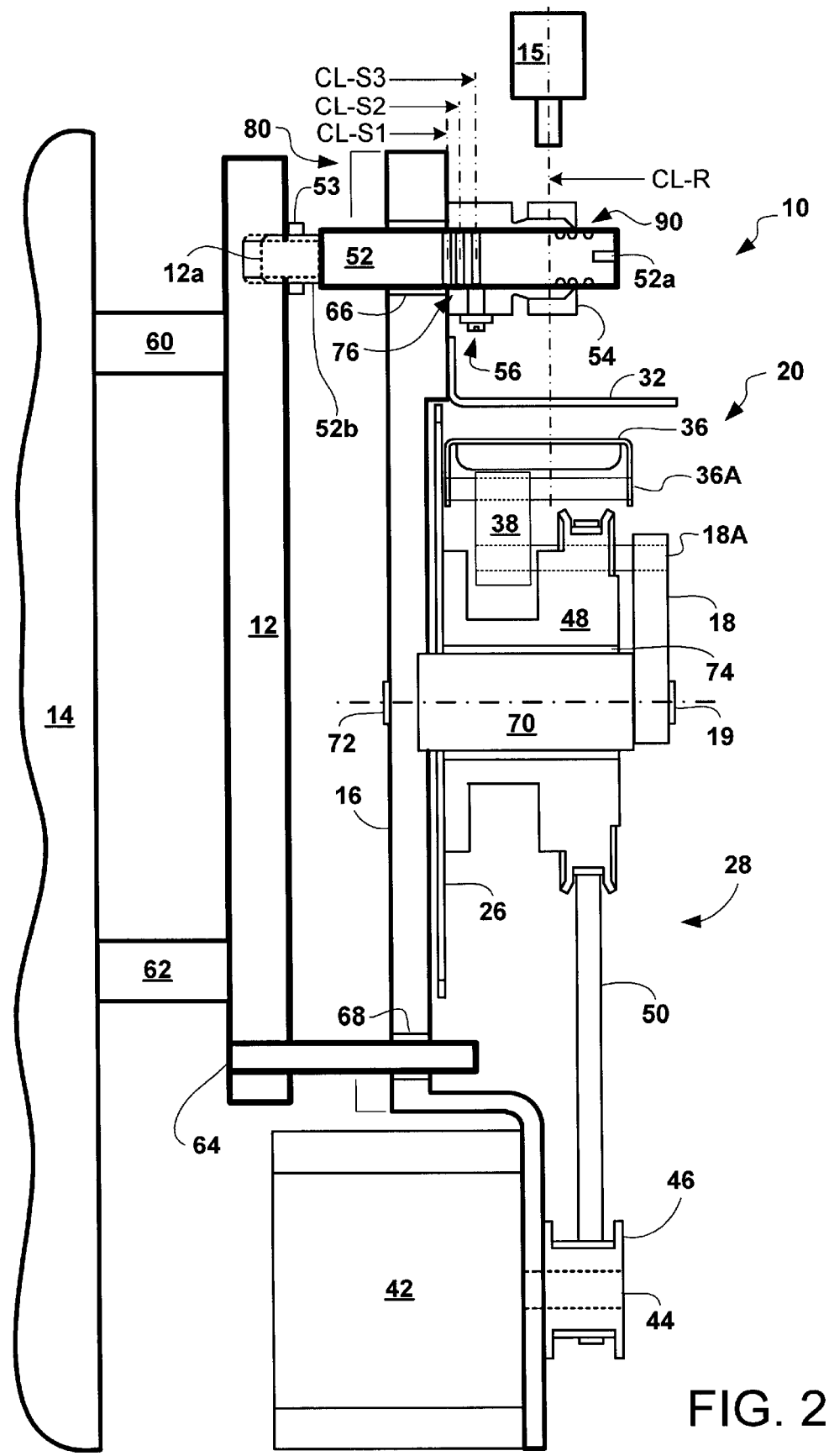
FIG. 2 is a cross-sectional view of FIG. 1 taken substantially along line 2—2.

Referring now to FIG. 2, therein is shown a cross-sectional view of FIG. 1 taken substantially along line 2—2. The feeder system 10 is mounted on the main frame 14 by several support pins, which support the mounting plate 12. For simplicity of illustration, only support pins 60 and 62 are shown.

The movable drive plate 16 is slidably mounted to the mounting plate 12 by the adjustment pin 52 and a support pin 64. Bushings 66 and 68 are provided so that the movable drive plate 16 can slide easily on the adjustment pin 52 and the support pin 64, respectively.

The drive mechanism 28 also includes a sprocket shaft 70, which is secured to the movable drive plate 16 by a bolt 72 and to which the outer plate 18 is secured using the bolt 19. A bushing 74 is provided to allow free running of the sprocket pulley 48.

The feeder width adjustment mechanism 30 includes the adjustment pin 52, which has the detent 56, which engages a plurality of notches 76 along the length of the adjustment pin. As an example, three notches 76 are shown which allow the movable drive plate 16 to be positioned so the sprocket 26 can be located with three different centerlines CL-S1, CL-S2, and CL-S3 for engaging the perforations of three different width tapes. The outermost position of the movable drive plate 16 from the main frame 14 is shown and the innermost position is represented by edges 80. The centerline CL-R of the robotic handling system 15 is the common centerline of the different width tapes 24 and the centerline CL-R is not effected by movement of the movable drive plate 16; i.e., the centerline of a pick and place mechanism will not be effected for different width tapes.

The securing device 54 has a locking mechanism 84 and a positioning mechanism 86. Various types of locking mechanism 84 and positioning mechanisms 86 would be evident to those having ordinary skill in the art. In the present invention, the locking mechanism 84 includes a threaded section of the securing device 54, which allow the securing device 54 to be immovably clamped to the adjustment pin 52 by tightening a locking nut 88. The positioning mechanism 86 includes a section of the securing device 54 having the detent 56, which engages the notches 76 on the adjustment pin 52 to provide positive positions for the securing device 54. As an option, notches 90 are provided to provide a visual indication of which of the notches 76 is engaged by the detent 56. Accordingly, the feeder system 10 in the example is capable of handling tapes with three different tape widths.

Figure 3:
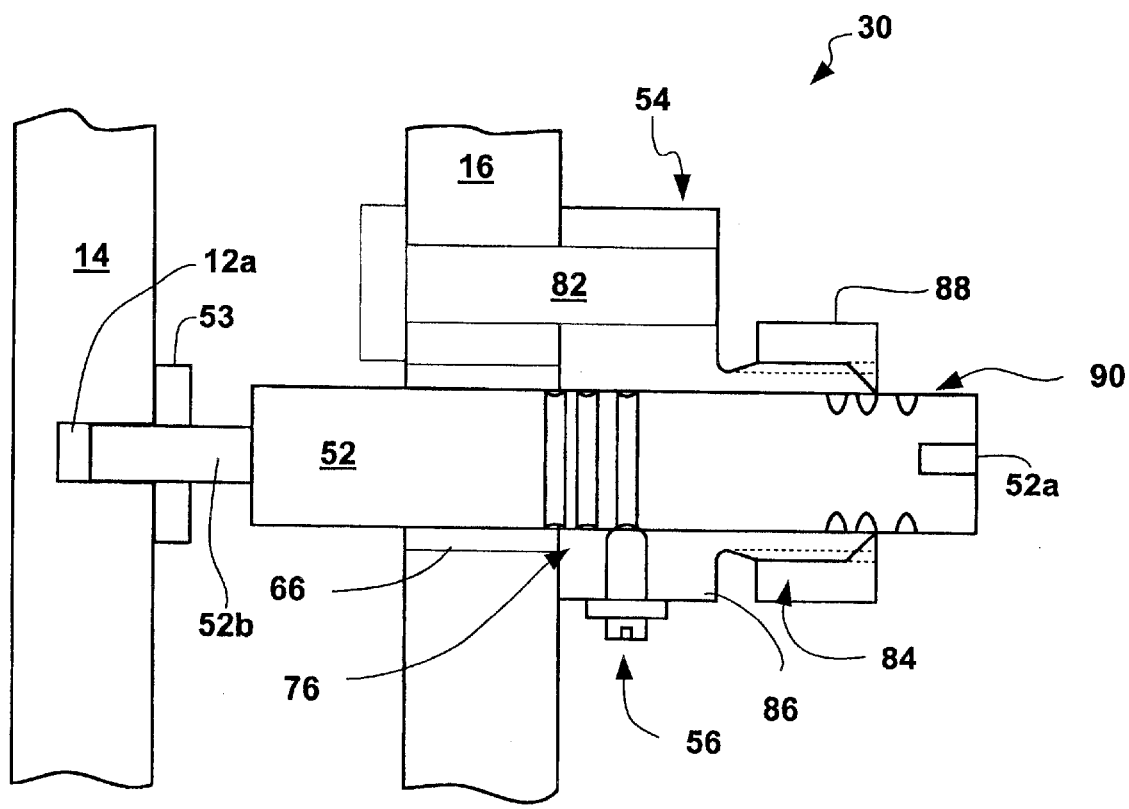
FIG. 3 is an expanded cross-sectional view of FIG. 1 taken along line 3—3.

Referring now to FIG. 3, therein is shown an expanded cross-sectional view of FIG. 1 taken along line 3—3 of the feeder width adjustment mechanism 30. The adjustment pin 52 is secured in the mounting plate 12 using the threaded end portion 52b and the locking device 53. The adjustment pin 52 extends through the movable drive plate 16 to engage the securing device 54. The securing device 54 is secured to the movable drive plate 16 by several bolts. For simplicity of illustration, only bolt 82 is shown.

The securing device 54 has a locking mechanism 84 and a positioning mechanism 86. Various types of locking mechanism 84 and positioning mechanisms 86 would be evident to those having ordinary skill in the art. In the present invention, the locking mechanism 84 includes a threaded section of the securing device 54, which allow the securing device 54 to be immovably clamped to the adjustment pin 52 by tightening a locking nut 88. The positioning mechanism 86 includes a section of the securing device 54 having the detent 56, which engages the notches 76 on the adjustment pin 52 to provide positive positions for the securing device 54. As an option, notches 90 are provided to provide a visual indication of which of the notches 76 is engaged by the detent 56. Accordingly, the feeder system 10 in the example is capable of handling tapes with three different tape widths.

The securing device 54 also carries the biasing mechanism 41 which applies force to the first arm 38.

Operation:

To align the feeder mechanism 20 with the robotic handling system 15, the locking device 53 is loosened. After the locking device 53 is loosened, the adjustment pin 52 is rotated by using a screwdriver, which engages with the slot 52a. Rotation of the adjustment pin 52 moves the movable drive plate 16 and the feeder mechanism 20 towards or away from mounting plate 12. After the feeder mechanism 20 is aligned with the robotic handling system 15, the locking device 53 is tightened to secure the adjustment pin 52.

Next, an operator determines the size of the micro devices to be processed and the corresponding width of the tape used to contain the micro devices. To adjust the width of the feeder system 10 to accommodate the tape to be processed, the locking nut 88 is loosened. After the securing device 54 is loose, the movable drive plate 16 is pushed in or pulled out until the detent 56 engages the desired notch 76 to provide a positive location of the sprocket 26 for the desired width tape. The movable drive plate 16 carries the sprocket 26, the drive mechanism 28, and the feeder width adjustment mechanism 30. The proper engagement and location can be visually determined by inspecting the notches 90. The locking nut 88 on the securing device 54 is tightened. The position of each of the movable drive plate 16 and the feeder mechanism 20 is fixed. The feeder system 10 is ready for operation.

After the feeder system 10 is aligned with the pick-and-place system in the product assembly line, the operator feeds the tape 24 between the top plate 32 and the bottom plate 36. The spring-loaded bottom guide 34 is pressed down to allow the pockets in the tape 24 to sit on the bottom plate 36 and then released. The perforations formed on one side of the tape engage with teeth of the sprocket 26. The cover tape 24a is threaded between the top plate 32 and the bottom plate 36 and connected to the cover tape mechanism 33. The motor 42 is turned on and the sprocket 26 rotates to drive the tape 24 while the cover tape mechanism 33 applies tension to the cover tape 24a to assured that it is peeled off of the carrier tape 24b. The micro devices on the tape 24 are presented in the proper position to the pick-and-place system. As discussed earlier, the push on the first arm 38 is transformed into second upward push onto the bottom plate 36 via the parallelogram formed by the outer plate 18, the bottom plate 36, the first arm 38, and the second arm 40. As a result, the tape is squeezed between the top plate 32 and the spring-loaded bottom guide 34. This will ensure smooth indexing of the tape through the feeder system 10.

Thus, the present invention provides a micro device feeder system, which is easily adjustable to accommodate micro devices supplied on tape with different widths and is simple and inexpensive.

From the above it will be understood that the present invention is applicable to what can be described as "micro devices". However, the present invention encompasses processing for all electronic, mechanical, hybrid, and other devices, which require testing, measurement of device characteristics, calibration, and other processing operations. For example, these types of micro devices would include but not be limited to devices such as microprocessors, integrated circuits (ICs), application specific integrated circuits (ASICs), micro mechanical machines, micro-electro-mechanical (MEMs) devices, micro modules, and fluidic systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set hither-to-fore forth herein or shown in the accompanying drawings are to be interpreted in an illustrative and non-limiting sense.

The invention claimed is:

1. A micro device feeder system for providing micro devices in tapes to a production assembly line, comprising:
   a mounting plate;
   a movable drive plate mounted to the mounting plate;
   an input mechanism mounted on the movable drive plate, the input mechanism capable of receiving the micro devices containing tapes;
   a tape driver on the movable drive plate capable of engaging and advancing the tapes provided by the input mechanism;
   a drive mechanism for driving the tape driver; and
   a feeder width adjustment mechanism for adjusting the micro device feeder system to accommodate tapes with different widths, the feeder width adjustment mechanism on the movable drive plate.

2. The micro device feeder system as claimed in claim 1 wherein:
the feeder width adjustment mechanism includes:
an adjustment structure coupled to the mounting plate, and
a securing device coupled to the movable drive plate, the securing device including:
a positioning mechanism for positioning the securing device along the adjustment structure; and
a locking mechanism capable of securing the securing device to the adjustment structure.

3. The micro device feeder system as claimed in claim 1 wherein:
the feeder width adjustment mechanism includes:
an adjustment structure movably mounted to the mounting plate, and
a locking device capable of securing the adjustment structure to the mounting plate.

4. The micro device feeder system as claimed in claim 3 including:
a robotic handling system;
and wherein:
the adjustment structure is adapted to align the input mechanism with the robotic handling system.

5. The micro device feeder system as claimed in claim 1 wherein:
the feeder width adjustment mechanism includes:
an adjustment structure movably mounted to the mounting plate, and
a securing device including a positive location mechanism for positioning the securing device and movable drive plate along the adjustment structure.

6. The micro device feeder system as claimed in claim 1 wherein:
the feeder width adjustment mechanism includes:
an adjustment structure movably mounted to the mounting plate and
a securing device including a visual indicator for indicating the location of the securing device and movable drive plate along the adjustment structure.

7. The micro device feeder system as claimed in claim 1 wherein:
the tape driver engages the tapes along edges of the tapes having a plurality of centerlines wherein the tapes have a common centerline; and
the tape driver is movable to accommodate the plurality of centerlines while maintaining the common centerline.

8. The micro device feeder system as claimed in claim 1 wherein:
the tape driver engages the tapes along edges of the tapes having a plurality of centerlines wherein the tapes have a common centerline;
the tape driver is movable to accommodate the plurality of centerlines while maintaining the common centerline and assuring positive linear movement of the tapes; and
the drive mechanism is mounted on the movable plate to remain stationary relative to the tape driver.

9. The micro device feeder system as claimed in claim 1 wherein:
the input mechanism includes:
a top plate secured to the movable drive plate,
a bottom guide biased towards the top plate; and
the tape driver is disposed between the bottom guide and the movable drive plate.

10. The micro device feeder system as claimed in claim 1 including:
an outer plate secured on the movable drive plate;
and wherein:
the input mechanism includes:
a top plate secured to the movable drive plate,
a bottom guide connected to the outer plate and biased towards the top plate; and
the tape driver is disposed between the outer plate and the movable drive plate, and the tape driver is disposed between the bottom guide and the movable drive plate.

11. The micro device feeder system as claimed in claim 1 wherein:
the input mechanism includes:
a top plate secured to the movable drive plate for removing a cover tape off the tapes to expose the micro devices.

12. The micro device feeder system as claimed in claim 1 including:
an outer plate secured on the movable drive plate outwardly of the drive mechanism;
and wherein:
the input mechanism includes:
a top plate secured to the movable drive plate and extending in the direction of tape advance;
a bottom guide connected to the outer plate and biased towards the top plate, the bottom guide including a bottom plate parallel to the top plate and movable away from the top plate to accommodate different depth tapes; and
the tape driver is disposed between the outer plate and the movable drive plate, and the tape driver is disposed between the bottom guide and the movable drive plate.

13. The micro device feeder system as claimed in claim 1 including:
an outer plate secured on the movable drive plate outwardly of the drive mechanism;
and wherein:
the input mechanism includes:
a top plate secured to the movable drive plate and extending in the direction of tape advance;
a bottom guide including first and second arms connected to the outer plate and a bottom plate parallel to the top plate to form a parallelogram, the bottom plate biased towards the top plate by a biasing mechanism between the first arm and the movable drive plate, the bottom plate movable away from the top plate to accommodate different depth tapes; and
the tape driver is disposed between the outer plate and the movable drive plate, and the tape driver is disposed between the bottom guide and the movable drive plate.

14. A micro device feeder system for providing micro devices in tapes to a production assembly line, comprising:
a mounting plate;
a movable drive plate mounted to the mounting plate and slidable with respect thereto;
means for moving the movable drive plate relative to the mounting plate;
an input mechanism mounted on the movable drive plate and movable therewith, the input mechanism capable of receiving the micro devices containing tapes;

a sprocket on the movable drive plate capable of engaging perforations provided in the edges of the tapes and advancing the tapes provided by the input mechanism;

a drive mechanism for driving the sprocket; and a feeder width adjustment mechanism for adjusting the micro device feeder system to accommodate tapes with different widths by moving the sprocket relative to a common centerline of the tapes, the feeder width adjustment mechanism on the movable drive plate.

15. The micro device feeder system as claimed in claim 14 wherein:

the feeder width adjustment mechanism includes:
an adjustment pin secured to the mounting plate wherein the movable drive plate is slidable thereon, and
a securing device coupled to the movable drive plate and having the adjustment pin movable therein, the securing device including:
a positioning mechanism for positioning the securing device along the adjustment pin; and
a locking nut capable of securing the securing device to the adjustment pin.

16. The micro device feeder system as claimed in claim 15 including:

a robotic handling system;

and wherein:
the adjustment pin is adapted to align the input mechanism with the robotic handling system.

17. The micro device feeder system as claimed in claim 14 wherein:

the feeder width adjustment mechanism includes:
an adjustment pin including a plurality of notches for different width tapes; and
a securing device including a detent engageable with the plurality of notches for positioning the securing device and movable drive plate along the adjustment pin.

18. The micro device feeder system as claimed in claim 14 wherein:

the feeder width adjustment mechanism includes:
an adjustment pin movably mounted to the mounting plate and
a securing device includes a plurality of visible notches for indicating the location of the securing device and movable drive plate along the adjustment pin.

19. The micro device feeder system as claimed in claim 14 wherein:

the sprocket engages the tapes along edges of the tapes having a plurality of centerlines wherein the tapes have a common centerline; and the sprocket is movable to accommodate the plurality of centerlines while maintaining the common centerline.

20. The micro device feeder system as claimed in claim 14 wherein:

the sprocket engages the perforations of the tapes having a plurality of centerlines wherein the tapes have the common centerline;

the sprocket is movable to accommodate the plurality of centerlines while maintaining the common centerline and assuring positive linear movement of the tapes;

the drive mechanism is mounted on the movable plate to remain stationary relative to the sprocket and includes:
a motor secured to the movable plate,
a motor pulley on the motor,
a sprocket shaft on the movable plate,
a sprocket pulley on the sprocket shaft, and
a belt connected to drive the sprocket pulley from the motor; and the sprocket is secured to the sprocket pulley.

21. The micro device feeder system as claimed in claim 14 wherein:

the input mechanism includes:
a top plate secured to the movable drive plate,
a bottom guide spring loaded towards the top plate; and
the sprocket is disposed between the bottom guide and the movable drive plate.

22. The micro device feeder system as claimed in claim 14 including:

an outer plate secured on the movable drive plate;

and wherein:
the input mechanism includes:
a top plate secured to the movable drive plate,
a bottom guide connected to the outer plate and spring loaded towards the top plate; and
the sprocket is disposed between the outer plate and the movable drive plate, and the sprocket is disposed between the bottom guide and the movable drive plate.

23. The micro device feeder system as claimed in claim 14 including:

an outer plate secured on the movable drive plate outwardly of the drive mechanism;

and wherein:
the input mechanism includes:
a top plate secured to the movable drive plate and extending in the direction of tape advance;
a bottom guide connected to the outer plate and biased towards the top plate, the bottom guide including a bottom plate parallel to the top plate and movable away from the top plate to accommodate different depth tapes; and
the sprocket is disposed between the outer plate and the movable drive plate, and the sprocket is disposed between the bottom guide and the movable drive plate.

24. The micro device feeder system as claimed in claim 14 including:

an outer plate secured on the movable drive plate outwardly of the drive mechanism;

and wherein:
the input mechanism includes:
a top plate secured to the movable drive plate and extending in the direction of tape advance;
a bottom guide including first and second arms connected to the outer plate and a bottom plate parallel to the top plate to form a parallelogram, the bottom plate biased towards the top plate by a spring between the first arm and the securing device on the movable drive plate, the bottom plate movable away from the top plate to accommodate different depth tapes; and
the sprocket is disposed between the outer plate and the movable drive plate, and the sprocket is disposed between the bottom guide and the movable drive plate.

* * * * *

UNITED STATES PATENT AND TRADEMARK OFFICE
CERTIFICATE OF CORRECTION

PATENT NO. : 6,666,365 B1
DATED : December 23, 2003
INVENTOR(S) : Feldman

It is certified that error appears in the above-identified patent and that said Letters Patent is hereby corrected as shown below:

Column 4,
Lines 5 and 8, delete "comer" and insert therefore -- corner --

Column 5,
Line 5, delete the paragraph:

"The securing device 54 has a locking mechanism 84 and a positioning mechanism 86. Various types of locking mechanism 84 and positioning mechanisms 86 would be evident to those having ordinary skill in the art. In the present invention, the locking mechanism 84 includes a threaded section of the securing device 54, which allow the securing device 54 to be immovably clamped to the adjustment pin 52 by tightening a locking nut 88. The positioning mechanism 86 includes a section of the securing device 54 having the detent 56, which engages the notches 76 on the adjustment pin 52 to provide positive positions for the securing device 54. As an option, notches 90 are provided to provide a visual indication of which of the notches 76 is engaged by the detent 56. Accordingly, the feeder system 10 in the example is capable of handling tapes with three different tape widths."

And insert therefore:

"The adjustment pin 52 includes a threaded end portion 52b which engages a threaded opening 12a formed in the mounting plate 12. The slot 52a allows the adjustment pin 52 to be rotated with the tip of a screwdriver. When the adjustment pin 52 is rotated in a clockwise direction, the adjustment pin 52, the movable drive plate 16 and the feeder mechanism 20 are moved towards the mounting plate 12. Conversely, when the adjustment pin 52 is rotated in a counter clockwise direction, the adjustment pin 52, the movable drive plate 16 and the feeder mechanism 20 are moved away from the mounting plate 12. This facilitates the alignment between the feeder mechanism 20 and the robotic handling system 15. A locking device 53 is used to secure the adjustment pin 52 to the mounting plate 12 when the feeder mechanism is in alignment with the robotic handling system 15. Various types of locking device 53 would be evident to those having ordinary skill in the art. In this embodiment, the locking device 53 is a nut."

Column 9,
Line 43, delete "plate and" and insert therefore -- plate, and --

Signed and Sealed this

Thirtieth Day of March, 2004

JON W. DUDAS
*Acting Director of the United States Patent and Trademark Office*